United States Patent [19]

Johnson

[11] 4,015,362
[45] Apr. 5, 1977

[54] FISHING LINE RELEASE MECHANISM

[75] Inventor: C. Evan Johnson, Onekama, Mich.

[73] Assignee: Hitachi Magnetics Corporation, Edmore, Mich.

[22] Filed: Mar. 15, 1976

[21] Appl. No.: 667,096

[52] U.S. Cl. .............................. 43/43.11; 43/21.2; 43/25

[51] Int. Cl.² ........................................ A01K 97/00

[58] Field of Search .................. 43/25, 21.2, 43.12, 43/15, 43.11, 42.72

[56] References Cited

UNITED STATES PATENTS

| | | | |
|---|---|---|---|
| 2,730,830 | 1/1956 | Smith | 43/25 |
| 2,749,648 | 6/1956 | Schneider | 43/43.12 |
| 2,864,199 | 12/1958 | Vollten | 43/43.11 |
| 3,136,086 | 6/1964 | Morrison | 43/43.12 |
| 3,499,242 | 3/1970 | Tucker, Sr. | 43/25 |

Primary Examiner—Warner H. Camp

[57] ABSTRACT

A fishing line release mechanism has a permanent magnet positioned within a housing with the poles of the magnet arranged to draw a magnetic tripping member into the housing through an opening in which the tripping member is positioned. The tripping member includes at least one belaying pin which is arranged with its axis across the opening in the housing when the member is in a position where it is near, or in contact with, the permanent magnet. When sufficient tension is applied to a fishing line wrapped around the belaying pin at the time the tripping member is closest to the permanent magnet, the member is pulled away from the magnet and the axis of the belaying pin is lined up with the direction of pull of the fishing line to release the line over the free end of the pin. The release mechanism may include means for variably positioning the magnet with respect to the tripping member as well as a line guide through which a line may be drawn to the belaying pin or pins.

7 Claims, 7 Drawing Figures

FISHING LINE RELEASE MECHANISM

BACKGROUND OF THE INVENTION

Many fishermen who use a rod and reel prefer not to hold the rod while waiting for the fish to strike. Rod holders have been developed for mounting on a spike which may be pushed into the ground or for mounting on a plate which may be fastened to the deck of a boat. In addition to holding the rod firmly, such rod holders must be able to release the rod quickly after a fish has struck so as to allow the fisherman to take over control during the landing of the fish.

A line release mechanism is also necessary when a rod holder is used. Such a mechanism must maintain sufficient tension on the line to avoid unreeling of the line during an operation such as trolling. However, when a fish strikes and exerts a greater-than-normal pull on the line, the release mechanism must free the line to the control of the reel. A typical release mechanism currently in use consists of a pair of buttons spring-biased toward each other. The line is run between the two buttons and the friction of the buttons against the line holds the line against moderate tension. When a fish bites, the additional pull on the line frees the line from the buttons and control of the line is thereafter exercised through the reel. Care must be taken to avoid cutting or kinking of the line by this type of release and other releases currently available on the market.

SUMMARY OF THE INVENTION

The present invention utilizes a permanent magnet to control the release of a line-release mechanism. The magnet is positioned in a housing where it can attract a tripping member having to-and-fro movement through an opening in the housing. Mounted on the tripping member outside of the housing are a pair of belaying pins which extend across the opening of the housing when the tripping member is in its closest position with respect to the magnet. The tripping member is pivotally mounted in slideways in the housing so that when it is drawn away from the magnet it pivots about 90° to line up the axes of the belaying pins with the direction of tripping member movement. Thus, a fishing line wound around the belaying pins when the tripping member is closest to the magnet will be released as the tripping member pivots upon being pulled away from the magnet.

DESCRIPTION OF PREFERRED EMBODIMENTS

Figure 1:
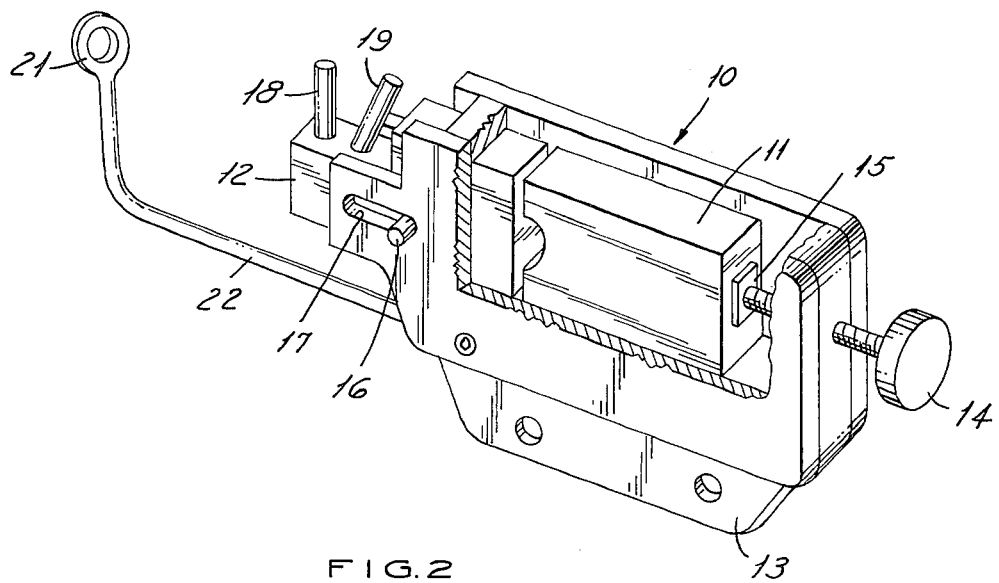
FIG. 1 is a cut-away perspective view of the release mechanism of this invention.

Referring particularly to FIG. 1, the line release mechanism of this invention comprises a housing 10 defining a passageway open at one end in which there is positioned a permanent magnet 11 and a tripping member or block 12. While the passageway is of rectangular cross-section in the embodiments illustrated, it can just as satisfactorily be of circular or other cross-section. The housing 10 includes a mounting tab 13 for positioning the mechanism in the most convenient location. The housing 10 may conveniently be composed of polymeric material but metals may also be used. To avoid any interference with the operation of the device, it is desirable that any metals used in the housing be non-magnetic.

Figure 3:
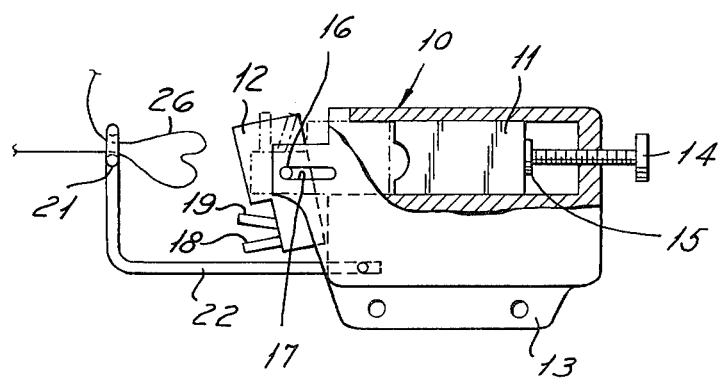
FIG. 3 is a broken partial schematic view illustrating the release of the line immediately after the tripping member has been pivoted to release position.
Figure 4:
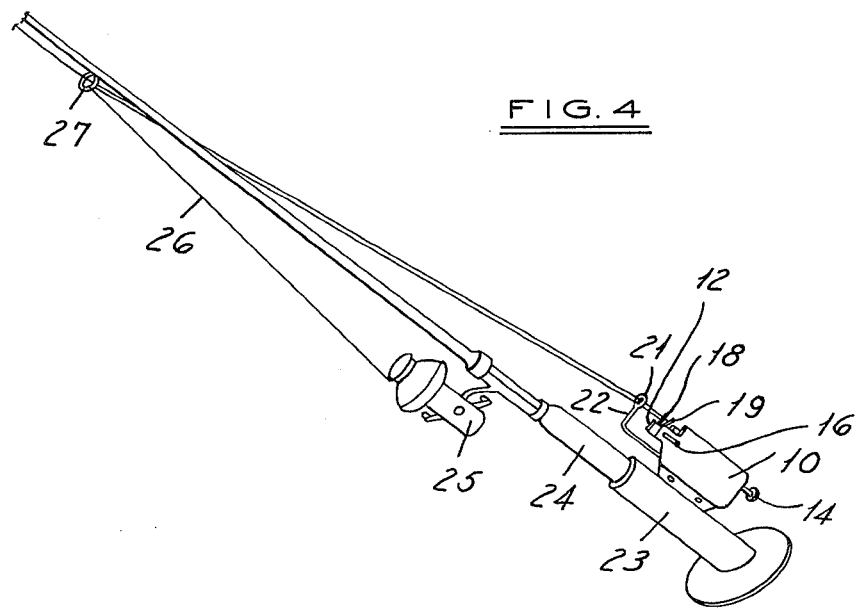
FIG. 4 is a broken partial schematic view of a fishing rod positioned in a rod holder illustrating the manner in which the line is passed from the reel to the release mechanism and back to the rod.
Figure 5:
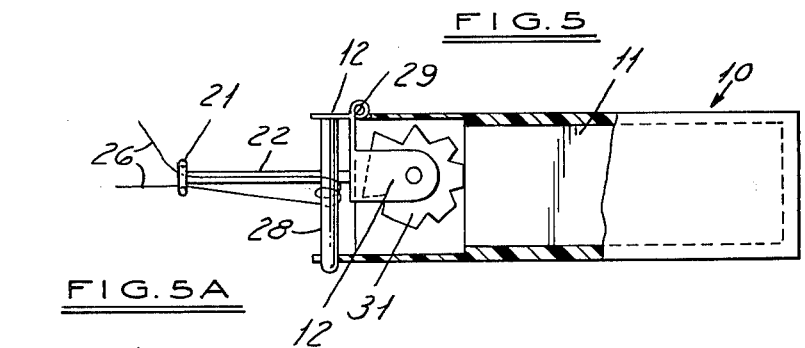
FIG. 5 is a partial schematic view of an alternative release mechanism.
Figure 6:
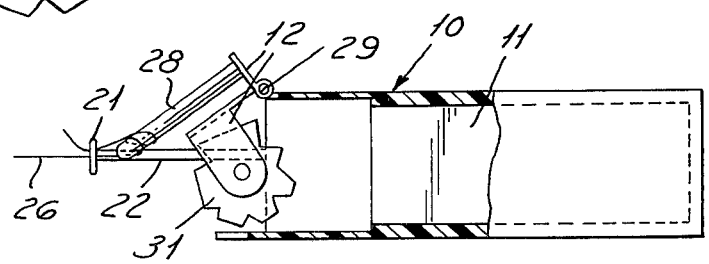
FIG. 6 illustrates the embodiment of FIG. 5 in tripped position.

The magnet 11 may be permanently positioned within the passageway — would be the case in the embodiment of FIGS. 5 and 6 — or it may be made axially movable along the passageway as illustrated in FIGS. 1 – 4, the preferred embodiment. As shown in FIG. 1, axial movement is provided by means of an adjusting screw 14 threaded through the housing 10 and connected to a bearing plate 15 mounted upon the magnet 11. The magnet 11 may be composed of a wide variety of magnetic material, ceramic magnets being entirely satisfactory, as well as such metal magnets as alnico. The magnet is designed so that the side facing the passageway opening provides maximum magnetic attraction.

The tripping member or block 12 is composed of magnetic material so as to be attracted to the magnet 11. As shown in FIGS. 1 – 4, this member is a generally L-shaped block and has a pair of pivot pins 16 extending through slideways 17 in the housing 10 which permit the tripping member to have limited to-and-fro movement along the axis of the passageway. The tripping block 12 of FIGS. 1 – 4 includes a pair of belaying pins 18 and 19 mounted to extend across the passageway when the tripping block 12 is in the position illustrated in FIGS. 1, 2 and 4. It will be noted that while the belaying pin 18 extends vertically from the surface on which it is mounted, the pin 19 is tilted slightly in the direction of the magnet 11. The purpose of this tilt is to prevent a line looped around the pins 18 and 19 from inadvertently slipping off. The use of two pins as in FIGS. 1 – 4 enables a line to be looped around in a figure 8 configuration. However, a figure 8 configuration of the line is not necessary to the proper functioning of the device as several loops around the outside of the pins will enable the line to be held without slipping. Accordingly, the two pins may be replaced by a single protruding spur or slab (not shown) around which the line may be looped. For this reason the term "pin" as used herein is not limited to members having a circular cross-sectional configuration but includes protrusions generally which may be utilized for the looping of line therearound. A line guide 21 mounted upon an outrigger 22 extending from the housing 10 is in axial alignment with the passageway.

The operation of the mechanism will now be described with particular reference to FIGS. 2 – 4. The release device of the invention is fixedly positioned with respect to a rod holder 23 as shown in FIG. 4. Positioned within the rod holder 23 is a fishing rod 24 on which is mounted a reel 25 equipped with line 26.

The line 26 from the reel 25 is passed through the line guides of the rod 24 in the conventional manner and bait or a lure is fastened to the end thereof and sufficient line unreeled for the fishing operation. Beyond a first line guide 27 of the rod 24 a loop of the line 26 is brought back through the line guide 21 of the release mechanism and looped around the belaying pins 18 and 19 as illustrated in FIG. 2. In FIG. 2, the line is shown as loosely wound around the belaying pins for purposes of illustration. However, in actual usage the line 26 would be in contact with these pins.

Figure 2:
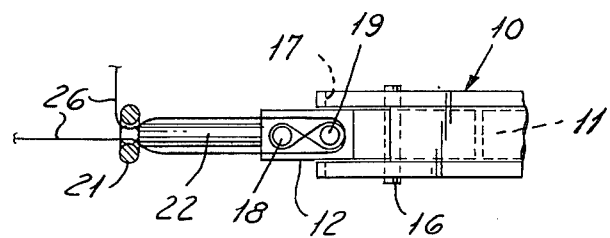
FIG. 2 is a broken plan view illustrating the manner in which fishing line is wrapped around the belaying pins.

With the tripping block 12 and belaying pins in the position illustrated in FIGS. 1, 2 and 4, the entire assembly is ready for trolling or other type of fishing. The magnet 11 is positioned along the passageway so as to exert the degree of attraction on the tripping member 12 best suited to the fish expected to strike the lure. When such a strike occurs, the tripping member is pulled along the passageway of the housing 10. As soon as the member clears the passageway, continued tension on the line 26 pivots the member 12 so that the pins 18 and 19 are brought into alignment with the axes of the passageway and line guide 21 as illustrated in FIG. 3. The line then slips free of the pins 18 and 19 and passes through the line guide 21. Continued movement of the fish or trolling craft takes up slack in the line which is thereafter controlled from the reel 25.

The release mechanism of this invention is usable not only with the rod holder illustrated in FIG. 4, but with outrigger and downrigger trolling as well. Where a downrigger is used, the release mechanism is fastened to the downrigger assembly. The line 26 is then looped through the mechanism in the manner described with reference to FIG. 4 and the release mechanism is then lowered overboard with the downrigger to the desired depth. When a fish strikes, the release mechanism operates in the manner previously described. Where an outrigger is used, the release is mounted on a pulley line extending to the protruding end of the outrigger pole so that the line may be wrapped around the release while it is inboard and it may then be moved on the pulley line to the outer end of the outrigger pole.

Figure 5A:
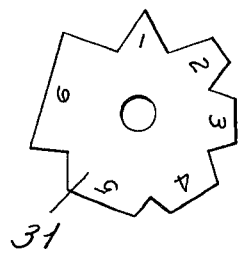
FIG. 5A is an enlargement of the tension-setter wheel of FIG. 5.

In the embodiment of FIGS. 5 and 6, the tripping member 12 has a single belaying pin 28 mounted thereon and is attached to a hinge 29 mounted upon the housing 10. Rotatably mounted on the tripping member 12 is a tension-setter wheel 31 composed of magnetic material. The wheel 31 has six surfaces of variable area which may be selectively rotated into position to make contact with the magnet 11 when the tripping member 12 is in the position illustrated in FIG. 5. As best seen in FIG. 5A, the surface of the wheel 31 making contact with the magnet 11 increases progressively from position 1 to position 6. Thus, position 1 provides the least tension on the line 26 and position 6 the greatest.

The operation of the release of FIGS. 5 and 6 is analogous to the operation of the release of FIGS. 1 – 4.

The line 26 is brought through the line guide 21 and looped around the single belaying pin 28 several times. The wheel 31 is then manually set to provide the desired attraction to the magnet 11 and the pin 28 is positioned as illustrated in FIG. 5. When there is sufficient pull on the line 26 to trip the tripping member 12, the parts assume the position illustrated in FIG. 6 and the line 26 pulls free of the pin 28.

While the invention has been described with reference to certain specific embodiments, it is obvious that there may be variations which properly fall within the scope of the invention. Accordingly, the invention should be limited in scope only as may be necessitated by the scope of the appended claims.

What I claim as new and desire to secure by letters patent of the United States is:

1. A fishing line release mechanism comprising: a housing defining an elongated passageway having an open end; a permanent magnet positioned within said passageway having a pole facing said open end; a tripping member composed of magnetic material positioned within the open end of said passageway, said tripping member being movable along said passageway from a position of strong attraction to said magnet to a position of weak attraction to said magnet; and at least one belaying pin mounted on said tripping member, said pin having its axis transverse to said passageway when said tripping member is in a position of strong attraction to said magnet and longitudinal with respect to said passageway when said member has been tripped to a position of weak attraction to said magnet as the result of a force exerted on said pin to pull said pin away from said magnet.

2. A release mechanism as claimed in claim 1 wherein the tripping member has two belaying pins mounted thereon and said member is pivotable and longitudinally slidable with respect to said passageway.

3. A release mechanism as claimed in claim 2 wherein the tripping member is a block having an L-shaped configuration and a pair of pivot pins positioned in longitudinal slideways in the housing.

4. A release mechanism as claimed in claim 2 wherein there is manually settable means whereby the magnet is fixedly positionable in different longitudinal positions within said passageway.

5. A release mechanism as claimed in claim 1 wherein the tripping member is hinged to the passageway wall near the opening thereof, the member including a magnetic rotatable roller having a plurality of peripheral surfaces of variable area one of which may be manually selected to be positioned adjacent to the magnet.

6. A release mechanism as claimed in claim 5 wherein a single belaying pin is mounted on the member.

7. A release mechanism as claimed in claim 1 which includes a line guide mounted on an outrigger to lead a line to the belaying pin.

* * * * *